June 4, 1946.　　　J. MIHALYI　　　2,401,702
RANGE FINDER
Filed Jan. 19, 1943　　　2 Sheets-Sheet 1
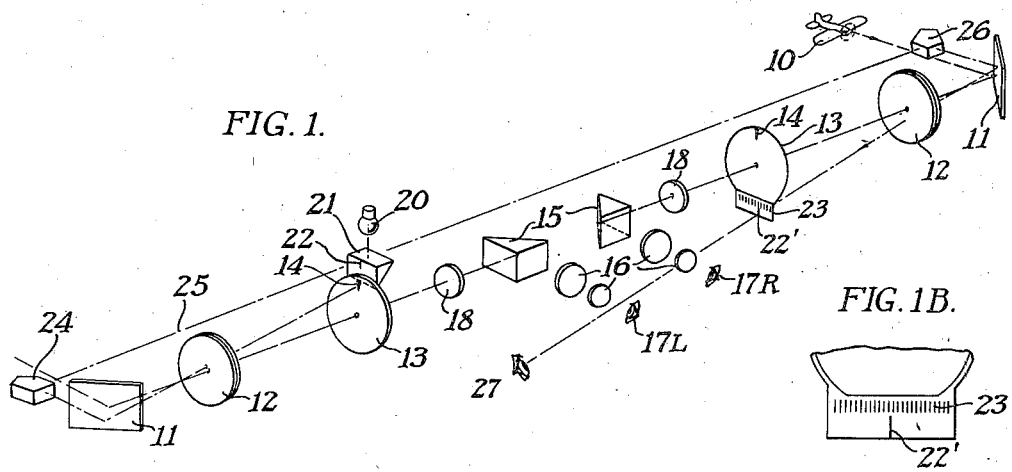
FIG. 1.
FIG. 1B.
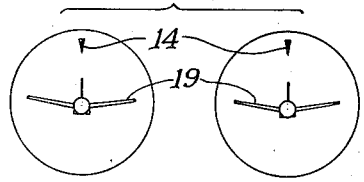
FIG. 1A.
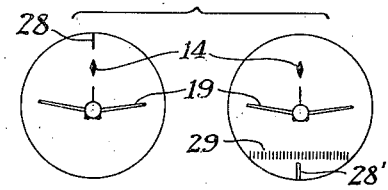
FIG. 2.
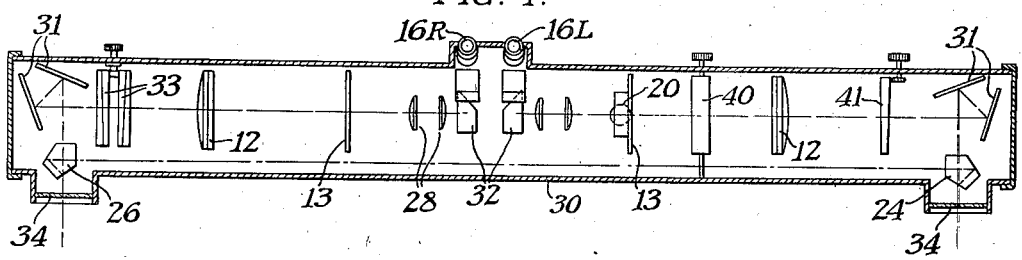
FIG. 4.
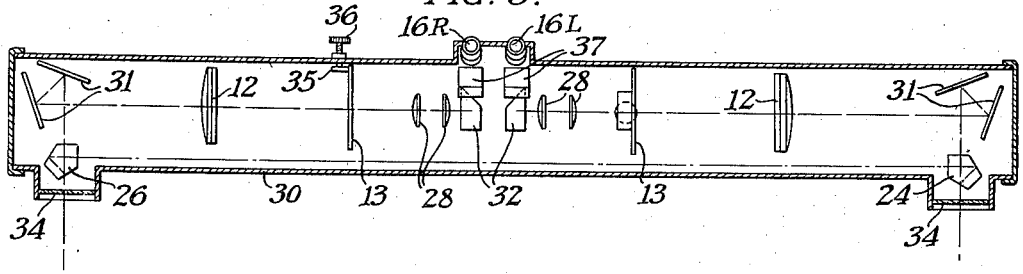
FIG. 5.
JOSEPH MIHALYI
INVENTOR
BY
ATT'Y & AG'T June 4, 1946.  J. MIHALYI  2,401,702
RANGE FINDER
Filed Jan. 19, 1943   2 Sheets-Sheet 2
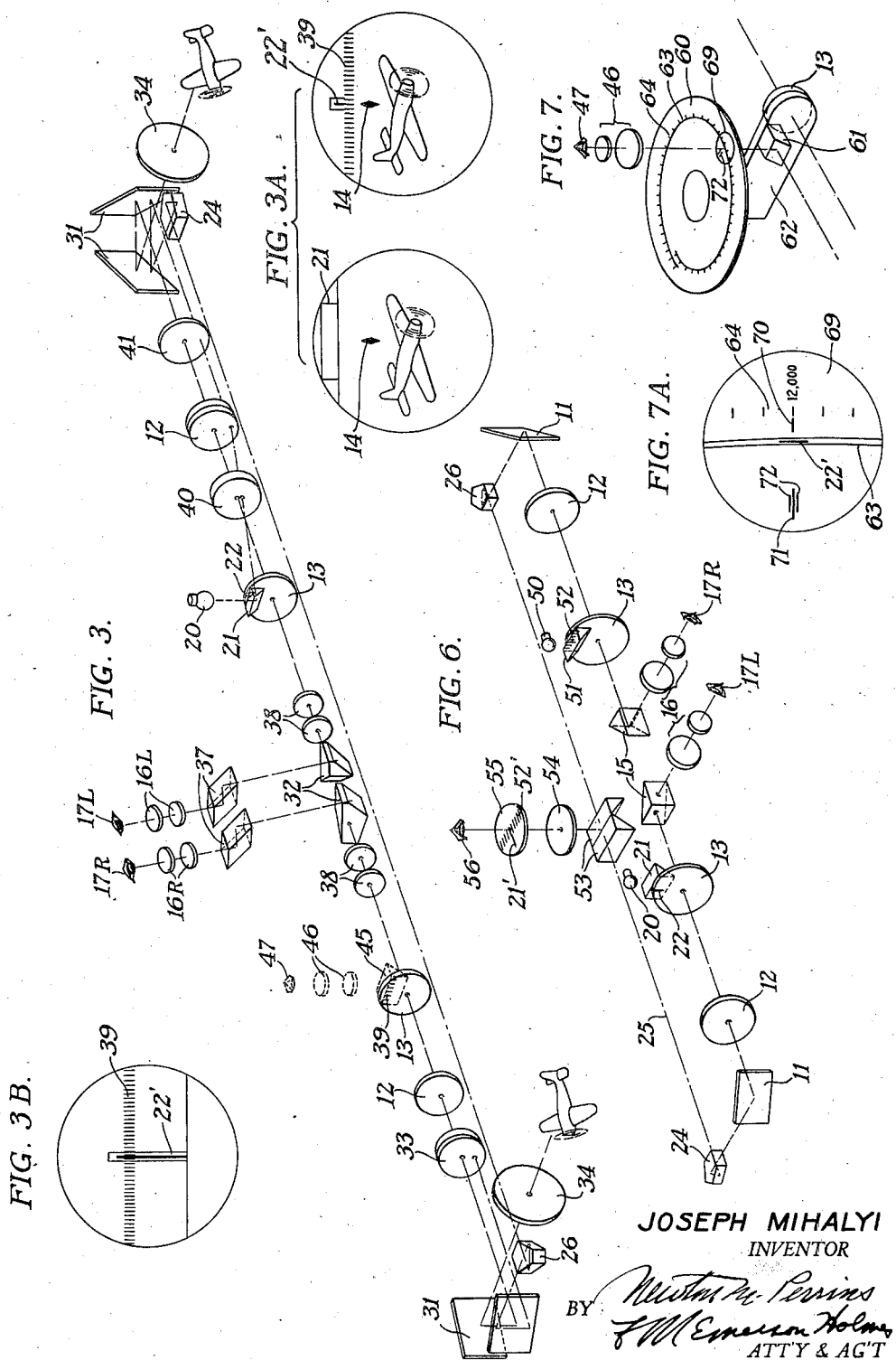
JOSEPH MIHALYI
INVENTOR Patented June 4, 1946

2,401,702

UNITED STATES PATENT OFFICE 2,401,702

RANGE FINDER

Joseph Mihalyi, Rochester, N. Y., assignor to Eastman Kodak Company, Rochester, N. Y., a corporation of New Jersey Application January 19, 1943, Serial No. 472,833

17 Claims. (Cl. 88—2.7)

1

This invention relates to range finders.

This is Case C of a series of applications relating to this same subject which series includes the following:

| Title | Serial No. | Filed | Inventors |
| --- | --- | --- | --- |
| Mount for optical elements. | 461,584 | Oct. 10, 1942 | Mihalyi. |
| Range finder construction. | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case L | 479,102 | Mar. 13, 1943 | Mihalyi. |
| Polarizing beam splitter. | 481,391 | Apr. 1, 1943 | MacNeille. |
| Range finders—Case M | 491,954 | June 23, 1943 | MacNeille. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |

Case A of this series relates broadly to an invention which has for its main object the reduction or elimination of errors due to maladjustment of the optical system of a range finder. The broad invention also provided an arrangement for viewing the range scale or its equivalent directly in the eyepiece of the range finder so as to give an automatically corrected reading while ranging and/or an indication that the instrument is in proper adjustment.

The present Case C relates to an invention having similar objects and advantages specifically with reference to stereo range finders.

Stereoscopic range finders usually consist of a housing with two spaced windows in the front thereof to constitute viewing points and with right and left eye eyepieces for viewing corresponding image planes in the housing. With each half of the system there is associated an optical system for forming in the image planes stereoscopic images of the object being ranged. These two images, viewed stereoscopically through the eyepieces, give an apparent object distance and reticle marks located in each of the image planes, viewed similarly, give an apparent mark distance depending on the relative position of the marks in the planes. In the form of stereo finder with which the present invention is concerned, some form of ranging adjustor such as a light deviating device or means for moving one of the reticle marks, is employed for adjusting either the apparent object distance or the apparent mark

2 distance or perhaps both so that the observer is able to make the object and mark appear at the same distance. The setting of the ranging adjustor is, in prior systems, an indication of the range.

According to the present invention, a pair of adjustment coincidant elements such as a scale and index or a coincidence line and fiducial mark are positioned one in each of the image planes or at least optically in the image planes. An image of one of these adjustment coincidant elements is projected (the projected beam passing through both the right and left eye optical systems) to form an image adjacent to the other adjustment coincidant element or at least adjacent to an image of the other element. To do this auxiliary reflectors are required near each of the windows for receiving light from one of the optical systems and reflecting it to the other auxiliary reflector and back into the other optical system. This beam of light for forming the element image must pass through the light deviating means if one is used or, if the ranging adjustor consists of means for moving one of the reticle marks, the same adjustor must move one of the adjustment coincidant elements. In either case, the relative apparent position of the elements is adjusted by the ranging adjustor.

To eliminate any error due to relative movement of the adjustment coincidant elements and the reticles, each element is preferably attached to the adjacent reticle mark to move therewith. Of course, in the case where a movable coincidence line constitutes one of the adjustment coincidant elements this attachment is not rigid. Preferably also the adjustment coincidant elements are visible in at least one of the eyepieces. The auxiliary reflectors are preferably optical squares such as penta-prisms which are small compared to the diameter of the adjacent windows so as not to interfere materially with the beams of the object being ranged. In one species of the invention to which this case is particularly directed, the adjustment coincidant elements are a scale and an index and the image of one of these elements is projected adjacent to the other element itself.

Other objects and advantages of the present invention will be fully understood from the following description when read in connection with the accompanying drawings, in which:

Fig. 1 is a perspective view of a stereo range finder incorporating the present invention. Fig. 1A shows the binocular view through the eyepieces of this finder. Fig. 1B shows the field of view of the ranging observer.

Fig. 2 shows the binocular view through the eyepieces of an embodiment only slightly different from that shown in Fig. 1.

Fig. 3 is a perspective view of a preferred embodiment of the invention. Fig. 3A is the binocular view through the eyepieces of the arrangement shown in Fig. 3. Fig. 3B is a view through the range observer's eyepiece of an embodiment slightly different from that shown in Fig. 3.

Fig. 4 is a plan view of a range finder whose optical system is shown in Fig. 3.

Fig. 5 is a plan view of a slightly different embodiment employing a similar optical system.

Fig. 6 is a perspective view of an alternative embodiment of the invention.

Fig. 7 is an alternative form of one detail of Fig. 3. Fig. 7A shows a view through the eyepiece of Fig. 7.

In Fig. 1 light from a distant object indicated by a small airplane 10 near the window of the finder is reflected by mirrors 11 through objectives 12 to form stereo images in comparison planes 13. These images are relayed by lenses 18 and prisms 15 to form images to be viewed through the eyepieces 16 by the right and left eyes 17R and 17L of an observer. The comparison planes are provided with reticle marks 14 which viewed stereoscopically give an apparent mark distance to be compared with the apparent object distance. These apparent distances are adjusted either by light deviating means or by moving one of the reticle marks until they are the same.

According to the invention, light from a lamp 20 is reflected by a prism 21 past an index 22 located in the same plane as the reticle mark 14. This light from the index 22 is collimated by the objective 12 and is reflected by mirror 11 and penta-prism 24 as indicated by ray 25 to another penta-prism 26 which in turn reflects it back into the range finder to be brought to focus as indicated by the ray 25 forming an image 22' in the comparison plane 13 which also carries a scale 23. In a simple form of the invention this index 22' may be read on the scale 23 by an auxiliary observer whose eye is shown at 27, and whose field of view is shown in Fig. 1B.

In a preferred form of the invention, however, the mark 22 is replaced by a mark 28 right in the comparison plane 13 as indicated best in Fig. 2. The image 28' of this mark is then in the other comparison plane adjacent to a scale 29. In this embodiment the scale 29 and index 28' may be read by the main observer while viewing the object images 19.

A somewhat more complicated arrangement is shown in Figs. 3, 4, and 5 wherein light from the object being ranged passes through the front windows 34 in the housing 30 of the finder and is reflected by optical squares 31 through objectives 12 to form the images in the comparison planes 13. These images are relayed by lenses 28, erecting prisms 32 and adjustable prisms 37 (which allow for different interpupillary separations) to the focal planes of the eyepieces 16R and 16L. The range is adjusted by a light deviating device 33 and zero adjustment is provided by a suitable deviator 41. Similarly, halving adjustment is provided by a tipping block 40. According to the invention, light from a lamp 20 through a prism 21 is brought to focus forming an image 22' adjacent to a scale 39 in one of the comparison fields 13. In the alternative embodiment illustrated by broken lines in Fig. 3, a prism 45 and eyepiece 46 are provided to allow an auxiliary observer whose eye is shown at 47 to read the range. The auxiliary observer's field of view is shown in Fig. 3B.

Fig. 5 differs from Fig. 4 by elimination of the light deviating means 33 and the substitution of a support 35 and driving screw 36 for moving the reticle mark 14 together with the scale 39 integrally attached thereto.

Fig. 6 illustrates a more complicated, and hence, less preferable embodiment of the invention, but it is included since it has certain advantages and also since it aids in distinguishing over some superficially similar prior art which fails to have an element image adjacent to another element or image thereof. In Fig. 6 the main difference from Fig. 1 is that the scale 52 is illuminated by a light source 50 and a prism 51 so that a light from the scale is projected through the system in a manner similar to that of the light from the index 21. These two beams are then reflected respectively by the optical squares 26 and 24 toward each other to strike prisms 53 which reflect both into alignment and upward through a lens 54 which brings the beams to focus in a focal plane 55 forming images 52' and 21', respectively. These images may then be viewed by the eye 56 of an auxiliary observer. Although either of the adjustment coincident elements may be considered as the one being described, it is still true that light from at least one of the elements is projected through the optical system of the range finder to form an image of this element adjacent to at least an image of the other element.

Fig. 7 relates to a preferred embodiment of the invention in which a coincidence line and fiducial mark are used to replace the scale and index but as far as the present invention is concerned—does not differ otherwise from Fig. 3. The complete optical system of a range finder having this feature is identical with Fig. 3 except for the method of viewing the scale, and hence, only this detail is shown in Fig. 7. The element beam approaching the reticle plane 13 is reflected upward by a reflector 61 to form an image at the optical equivalent of the reticle plane 13. This image 22' as shown in Fig. 7A acts as the fiducial mark to indicate the proper setting of a coincidence line 63 carried on a disk 60 in the image plane. In the operation of the device the auxiliary observer whose eye is shown at 47, rotates the disk 60 until the coincidence line 63 is in coincidence with the image 22' as shown in Fig. 7A. Of course, any suitable scale and index could be provided on the disk 60, but for convenience the scale 64 is adjacent to the spiral coincidence line 63 so as to be readable in the field of the eye piece 46. An index for the scale 64 is shown as the mark 70 which may be either engraved on a disk 69 adjacent to the disk 60 or may be projected through the optical system along with the index 22. To insure no relative movement of the coincidence line 63 (specifically of its center which is the pivot point of the disk 60) and the reticle mark in the image plane 13, the disk 60 is pivotally mounted on an arm 62 cemented to the disk 60 and to the prism 61.

Since the setting of the halving adjustor 40 may have a second order effect on the ranging device when a fiducial mark and coincidence line are used, the index 22 includes a mark at right angles thereto which when projected through the optical system forms an image 71 as shown in Fig. 7A. For proper adjustment this image 71 must fall between two marks 72 engraved on the disk 69. If the image 71 does not appear in this position, the halving adjustor is operated to correct this. If the mark 70 is also an image, it will, of course, be brought to the correct reading when the mark 71 is properly adjusted. It is for this reason that the mark 70 may be either projected through the optical system or engraved on the disk 69 to act as an index to the scale 64. This feature of the invention is discussed in detail in Case E of this series.

Having thus described various embodiments of my invention, I wish to point out that it is not limited to these structures, but is of the scope of the appended claims.

I claim:

1. A stereoscopic range finder comprising a housing with two spaced windows in the front thereof, right and left eye eye-pieces for viewing corresponding image planes in the housing, an optical system associated with each window for forming in said image planes, stereo separation images of the object being ranged, the two images fusing stereoscopically to give an apparent object distance, a reticle mark at least optically in each plane fusing stereoscopically to give an apparent mark distance and a ranging adjuster for adjusting said apparent distances relative to one another to make them the same, said range finder being characterized by a pair of adjustment condicant elements each at least optically in one of the image planes respectively, and means, including both optical systems and reflectors near the windows for reflecting light from one system into the other, for receiving light from at least one of the elements and for focusing adjacent to at least an image of the other element, an image of said one element, the relative apparent position of the elements being also adjusted by the ranging adjuster.

2. A range finder according to claim 1 in which each element is attached directly to the adjacent reticle mark to move therewith.

3. A range finder according to claim 1 in which the ranging adjuster comprises means for moving one reticle mark and one element laterally.

4. A range finder according to claim 1 in which the ranging adjuster comprises light deviating means in the path of both the element image forming beam and one of the object image forming beams.

5. A range finder according to claim 1 in which said one element and said other element image are viewable through one of the eyepieces.

6. A range finder according to claim 1 in which the reflectors are optical squares which are small compared to the diameters of the adjacent windows.

7. A range finder according to claim 1 in which said one element is viewable substantially directly and the other element image is projected adjacent to said one element itself.

8. A range finder according to claim 1 in which said elements are a scale and an index.

9. A range finder according to claim 1 in which halving adjustment indication marks are included adjacent to the elements and said marks are optically operated on by said light receiving and image focusing means in the same way as said elements.

10. A range finder comprising a tubular housing having two windows in the front thereof near the ends of the housing, reflectors immediately behind each window for reflecting light beams coming through the windows approximately at right angles toward the center of the housing, reflecting devices near the center of the housing for receiving the two beams and reflecting them parallel to each other, right and left eye eyepieces respectively for receiving the parallel beams, a reticle mark in each beam at least optically at the focal plane of each eyepiece, an objective in each beam between the reticle mark and the window and at its focal length axially from the reticle mark for forming in the reticle plane an image of the object being viewed by the window, stereoscopic fusion giving apparent object and reticle mark distances, means for transversely adjusting relative to one another the object image and reticle mark in one of the reticle planes to make said apparent distances the same, said range finder being characterized by one of a pair of adjustment coindicant elements at least optically in one reticle plane, the other of said pair being adjacent to and at least optically in the other reticle plane, a reflecting surface positioned to give a virtual image of one element in said other reticle plane as viewed from the corresponding objective, means for illuminating one of the elements so that light passes therefrom through the corresponding objective and reflector to form a collimated beam directed at least approximately toward the corresponding front window, an optical square which is small compared to the reflector and which is near the window for receiving the collimated beam and directing it toward the other window, a second small optical square correspondingly located near said other window for redirecting the collimated beam to the other reflector and objective and into focus to form an image of said one element adjacent to the other element, means for viewing said element image and said other element at least at the point where one element coincides with the other, said adjusting means being coupled to move said element image relative to said other element.

11. A range finder according to claim 10 in which said elements are a scale and an index.

12. A range finder according to claim 10 including relay lenses between the reticle planes and the focal planes of the eyepieces for focusing in said focal planes images of the reticle marks.

13. A range finder according to claim 10 in which each objective is between its reticle plane and the corresponding reflector.

14. A range finder according to claim 10 in which the adjusting means moves the reticle mark.

15. A range finder according to claim 10 in which the adjusting means includes wedges for adjusting the object image and the element image.

16. A range finder according to claim 10 in which an index is the element which is illuminated and which is projected into focus adjacent to the other element which is a scale.

17. A range finder according to claim 10 in which the illuminated element includes a line which is one of the elements and a line at right angles thereto whose image is similarly projected adjacent to the other element and in which fixed marks are included adjacent to the other element for comparison with the latter line image to check whether the finder is in proper halving adjustment.

JOSEPH MIHALYI.